United States Patent [19]
Oberg et al.

[11] Patent Number: 5,242,183
[45] Date of Patent: Sep. 7, 1993

[54] BICYCLE ACCESSORY FOR STABILIZATION WHILE POPPING WHEELEES

[76] Inventors: Robert Oberg; Wilbur Oberg, both of 6812 Rte. 25A, Syosset, N.Y. 11791

[21] Appl. No.: 738,816

[22] Filed: Aug. 1, 1991

[51] Int. Cl.⁵ .............................................. B62K 5/00
[52] U.S. Cl. ................................. 280/293; 280/288.4; 280/296
[58] Field of Search ..................... 280/287, 288.4, 293, 280/295, 296

[56] References Cited
U.S. PATENT DOCUMENTS

| | | | |
|---|---|---|---|
| 3,284,096 | 11/1966 | Hansen et al. | 280/289 |
| 3,321,047 | 5/1967 | Ryan et al. | 280/293 |
| 3,437,351 | 4/1969 | Newbern | 280/293 |
| 3,888,511 | 6/1975 | Parrilla | 280/239 |
| 3,961,810 | 6/1976 | Arico | 280/239 |
| 3,997,185 | 12/1976 | Parrilla | 280/289 |
| 4,012,054 | 3/1977 | Moore | 280/239 |
| 4,153,268 | 5/1979 | Wilson et al. | 280/296 |
| 4,154,452 | 5/1979 | Newman | 280/293 |
| 4,353,571 | 10/1982 | Anderson | 280/295 |
| 4,772,037 | 9/1988 | Jones | 280/293 |
| 4,900,047 | 2/1990 | Montague et al. | 280/287 X |

Primary Examiner—Margaret A. Focarino
Assistant Examiner—Carla Mattix
Attorney, Agent, or Firm—Brumbaugh, Graves, Donohue & Raymond

[57] ABSTRACT

A bicycle accessory is provided for stabilizing a bicycle while the operator of the bicycle pops a wheelee. The accessory acts as a safety by providing one or more wheelee wheels behind the rear wheel to limit the upward excursion of the front wheel of the bicycle. The accessory is attachable and detachable from conventional bicycles of various sizes and designs. The accessory is adjustable in size for compatibility and operator preference. The accessory is convertible between receiving one or two wheelee wheels.

17 Claims, 4 Drawing Sheets

BICYCLE ACCESSORY FOR STABILIZATION WHILE POPPING WHEELEES

BACKGROUND OF THE INVENTION

The invention relates to a bicycle accessory for stabilizing a bicycle when its front wheel is off the ground. In particular, the invention relates to providing one or more wheels behind the rear wheel of a bicycle for providing stabilization of the bicycle when the front wheel is off the ground and for providing an alternate method of operating the bicycle by riding on the rear wheel and the one or more wheels behind the rear wheel.

Bicycle operators while cycling often raise the front wheel of the bicycle off the ground. This exercise is commonly referred to as "popping a wheelee". While popping the wheelee, the operator balances himself or herself and the bicycle on the rear wheel of the bicycle. In this unstable position, the operator at first often finds it difficult to practice popping wheelees without falling. Experienced operators often attempt simple tricks while popping a wheelee. Operators often maintain a wheelee for a prolonged period of time. Because of the instability of a bicycle while an operator is popping and maintaining a wheelee, it is desirable to attach an accessory to the bicycle that will help stabilize it during wheelees. The accessory acts as a safety feature by minimizing falls while popping wheelees, as a training aid while learning how to pop wheelees and as a means of operating the bicycle unconventionally by utilizing the one or more wheels behind the rear wheel.

An object of the present invention is to provide a bicycle accessory with one or more wheels behind the rear wheel of the bicycle that will prevent the front wheel of the bicycle from lifting so high off the ground as to cause the bicycle to flip over.

A second object of the present invention is to provide a bicycle accessory that is adjustable for attachment to bicycles of varying sizes and designs.

A third object of the present invention is to provide a bicycle accessory that is easily attached and easily detached from the bicycle.

A fourth object of the present invention is to provide a bicycle accessory that stabilizes the bicycle side to side while the operator is popping a wheelee.

A fifth object is to provide a bicycle accessory that introduces an alternative method of operating the bicycle, i.e., by using the rear wheel and the one or more wheels behind the rear wheel rather than the front and rear wheels.

SUMMARY OF THE INVENTION

The present invention attains the foregoing and other objects by providing a bicycle accessory for stabilizing a bicycle when the front wheel of the bicycle is off the ground. The bicycle accessory has a first pair of frame members arranged for attachment together at one end of the frame members to the bicycle seat post. The first pair of frame members carries one or more wheelee wheels at the second remote end of the first pair of frame members. A second pair of frame members are attached to the first pair of frame members intermediate between the ends of the first pair of frame members. Additionally, the second pair of frame members are arranged for attachment to the rear axle of the bicycle.

DESCRIPTION OF THE PREFERRED EMBODIMENTS

Figure 1:
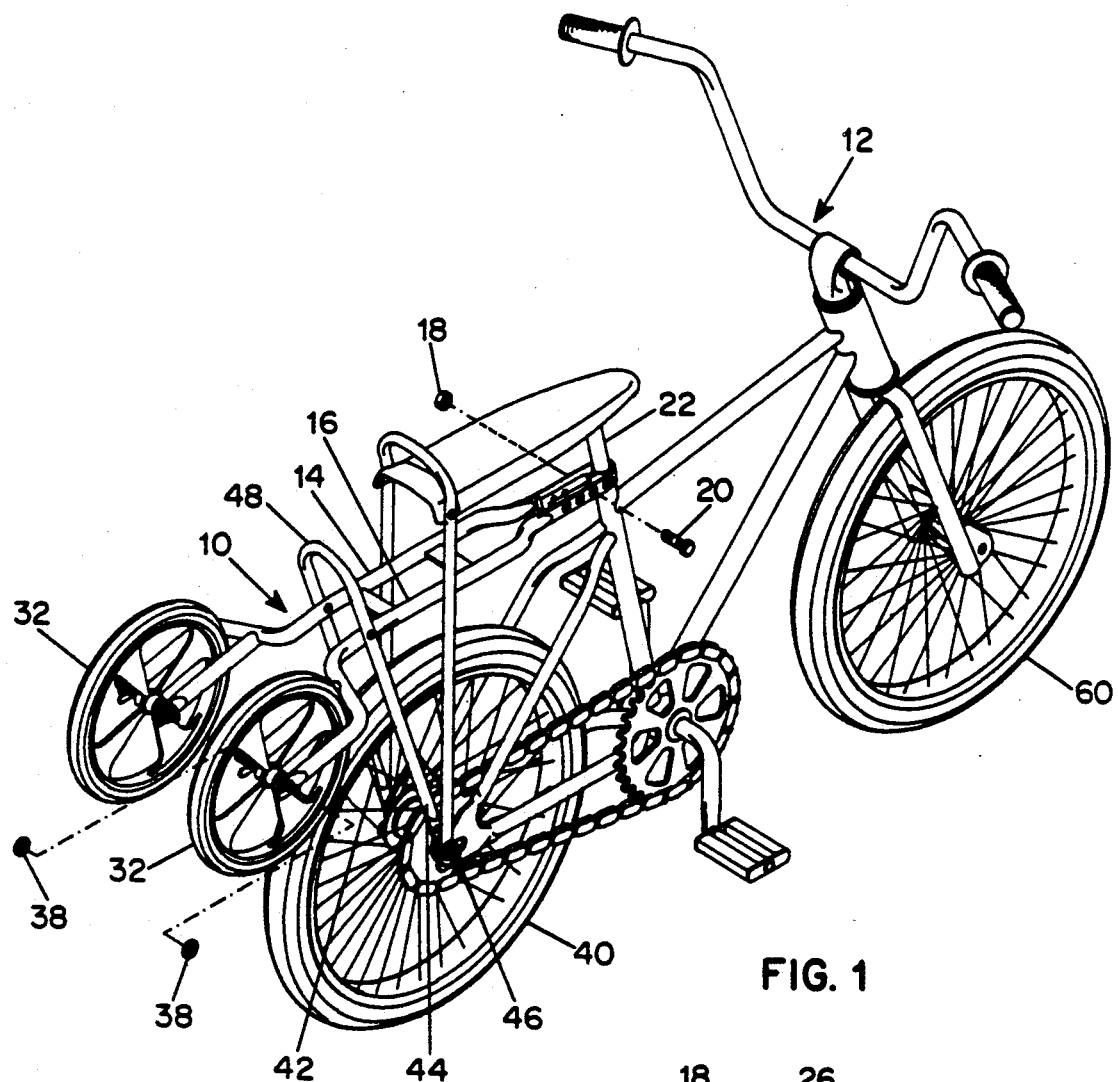
FIG. 1 is a perspective view of a preferred embodiment of the bicycle accessory attached to the bicycle.
Figure 2:
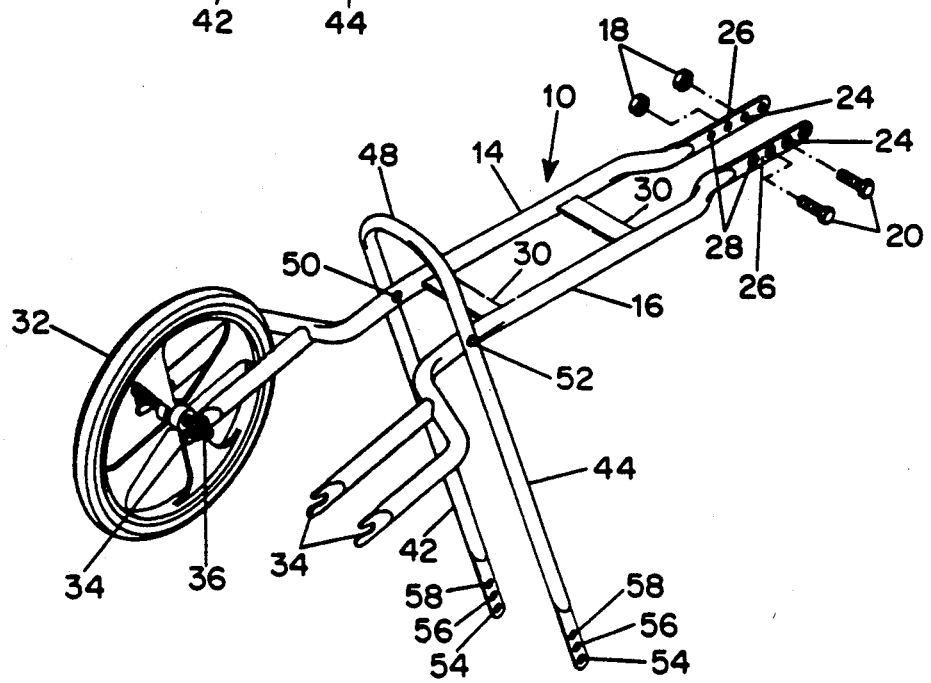
FIG. 2 is a perspective view of the same preferred embodiment of the bicycle accessory illustrated in FIG. 1 with the bicycle accessory not attached to a bicycle.

FIGS. 1 and 2 illustrate a preferred embodiment of the present invention. FIG. 1 shows a bicycle accessory 10 assembled and attached to a bicycle 12. FIG. 2 illustrates the bicycle accessory 10 partially assembled but unattached to a bicycle. The bicycle accessory 10 has a first pair of frame members 14 and 16 substantially parallel to each other. The frame members 14 and 16 are substantially parallel to the ground when the bicycle 12 is in its conventional upright position as shown in FIG. 1. At one end, the frame members 14 and 16 bend inward toward each other then bend outward closer to that end such that the frame members 14 and 16 are once again parallel but with a smaller separation between them. The frame members 14 and 16 are attached together by one or more nut 18 and bolt 20 combinations at that end such that the frame members 14 and 16 attach to a bicycle seat post 22. The end of each frame member 14, 16 that attaches to the bicycle seat post 22 has three holes 24, 26 and 28 through which the bolts 20 connect the frame members to the seat post 22. By selecting which of the holes 24, 26, 28 will be utilized for bolting the frame members 14 and 16 to the seat post 22, the distance behind which the bicycle accessory 10 extends can be varied according to the size and style of bicycle 12 or to the preference of the operator of the bicycle 12. For additional support, frame members 14 and 16 can be connected to each other by one or more plates 30 aft of the holes 24, 26, 28 as illustrated in FIG. 2.

The second remote end, opposite the end attached to the seat post 22, of each of the first pair of frame members 14, 16 is fork-shaped for receiving a wheelee wheel 32 therein. FIG. 2 depicts only one wheelee wheel 32 attached. The end of each prong of the fork has a hole 34 through which a wheelee axle 36 mounted to the wheelee wheel 32 extends for attaching the corresponding wheelee wheel to its frame member 14 or 16 with tightening nuts 38. In this arrangement, one wheelee wheel 32 is positioned on each side of and behind the rear wheel 40 of the bicycle 12. Alternatively, the holes 34 in the inside prongs of the forks of the first pair of frame members 14, 16 can receive one wheelee wheel axle 36 between them resulting in having one wheelee wheel 32 directly behind the rear wheel 40 of the bicycle 12 for uses in which the operator desires having only one wheelee wheel 32 attached rather than two.

The first pair of frame members 14 and 16 is held in place by a second pair of frame members 42 and 44 that extends upward from the rear axle 46 of the bicycle 12. The second pair of frame members can be joined at the top forming an inverted U-shaped frame 48. The second pair of frame members 42 and 44 attaches to the first pair of frame members 14, 16 intermediate between the ends of the first pair of frame members. The second pair of frame members 42 and 44 bolted to the first members 14 and 16 at holes 50 and 52, respectively, provide support for the first pair of frame members and the wheelee wheels 32 connected thereto. Each bottom end of the second pair of frame members 42 and 44 has three holes 54, 56 and 58. The rear axle 46 is received through one of the three holes for attaching the second pair of frame members 42 and 44 to the bicycle 12. By having three sets of holes, the height of the second pair of frame members 42 and 44 and, thus, holes 50 and 52, are adjustable for various bicycle sizes and designs. Holes above and below holes 50 and 52 of the second pair of frame members 42 and 44 can be added for adjustability as can holes fore and aft of holes 50 and 52 of the first pair of frame members 14 and 16.

Assembled as described above, the bicycle accessory 10 will provide stabilization of the bicycle 12 when the front wheel 60 is raised off the ground, i.e., when the bicycle operator pops a wheelee. The wheelee wheels 32 will limit the angle of the bicycle 12 and the ground to approximately 45°. The actual size of the maximum angle will vary depending on the size and design of the bicycle and on which of holes 24, 26, 28, 54, 56 and 58 are utilized in assembling the bicycle accessory 10. If the operator causes the front wheel to rise too high, either one or both of the wheelee wheels 32 will come in contact with the ground preventing any further upward excursion. With one wheelee wheel 32 to either side of the rear wheel 40 as illustrated in FIG. 1, if the bicycle 12 is angled to one side during a wheelee, the wheelee wheel 32 on that side will come in contact with the ground, providing additional stability. Alternatively, the operator can ride the bicycle 10 with the rear wheel 40 and the wheelee wheels 32 intentionally in contact with the ground, with the bicycle, in effect, operating as a tricycle.

Figure 3:
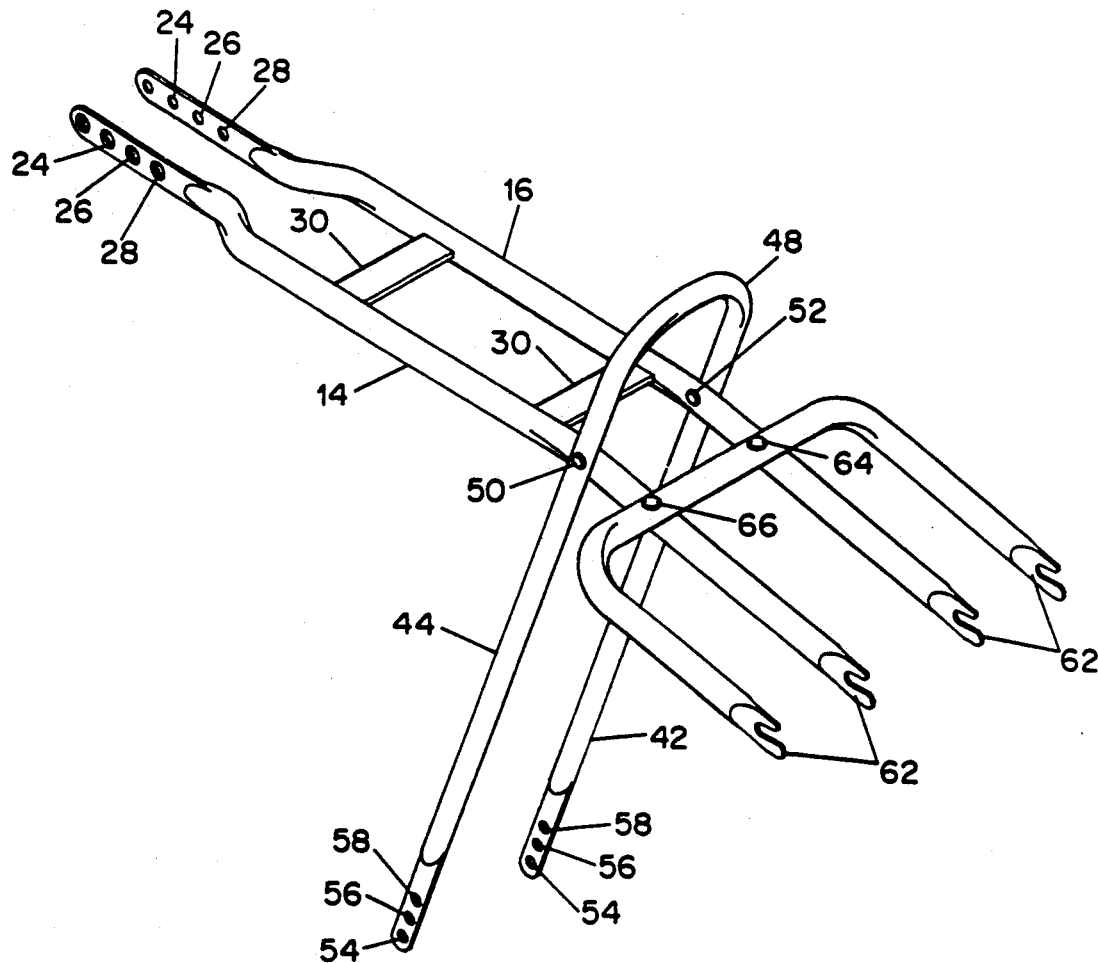
FIG. 3 is a perspective view of another preferred embodiment of the bicycle accessory.

FIG. 3 illustrates a partially assembled bicycle accessory 10 in another preferred embodiment. Each of the first pair of frame members 14 and 16 do not have fork-shaped ends in which a separate wheelee wheel 32 is received between the prongs. Rather, the frame members 14, 16 each extend aft with a grooved piece 62 at the remote end for receiving the axle of the wheelee wheel 32. In this configuration, one wheelee wheel 32 is received between the two first frame members 14 and 16 directly behind the rear wheel 40. The first pair of frame members 14 and 16 have additional holes 64 and 66 for attaching a substantially U-shaped fifth frame member 68 to the first pair of frame members between the intermediate holes 50, 52 where the first and second frame members 14, 16, 42, 44 are attached and the remote end of the first pair of frame members. The tips of the substantially U-shaped fifth frame member are aft of holes 64 and 66 and outside the remote end of the first pair of frame members 14 and 16. The tips have grooved pieces 62 that line up with the grooved pieces 62 at the remote end of the first pair of frame members 14 and 16. A wheelee wheel 32 is receivable between the grooved piece 62 of first frame member 14 and the grooved piece 62 of the U-shaped frame member tip outside first frame member 14. Similarly, a wheelee wheel 32 is receivable between the grooved piece 62 of first frame member 16 and the grooved piece 62 of the U-shaped frame member tip outside the first frame member 16. In other words, a wheelee wheel 32 is located behind but to other side of the rear wheel 40 of the bicycle 12. Thus, in this preferred embodiment, the bicycle accessory 10 can easily be convertible between having one or two wheelee wheels 32 attached.

Figure 4:
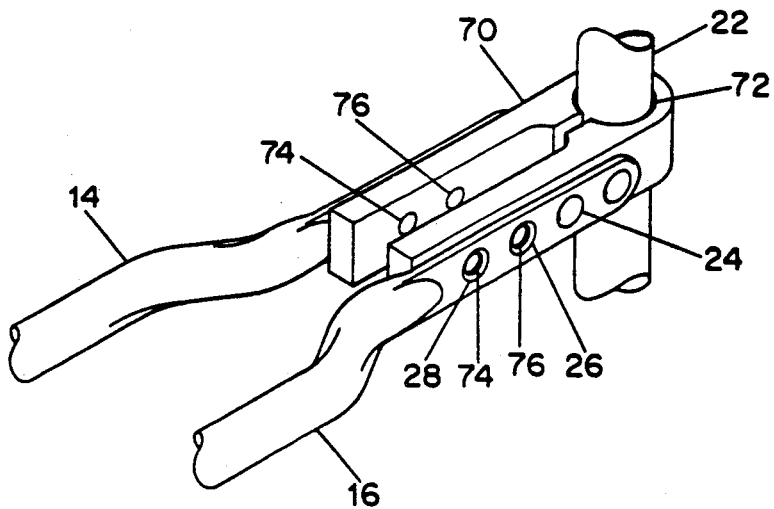
FIG. 4 is a perspective view of a collar for attaching the bicycle accessories depicted in FIGS. 1-3 to a bicycle seat post.

FIG. 4 shows a clamp 70 having an opening 72 at one end through which seat post 22 is inserted. The outer side surfaces of the other end of the clamp 70 is shaped to receive the ends of the first pair of frame members 14 and 16. Each of holes 74 and 76 on the sides of the clamp 70 are spaced for receiving a bolt (not shown) for securing the first pair of frame members 14 and 16 to the outer side surfaces of the clamp 70 and, thus, to the seat post 22. By further tightening the bolt, or by another means, the clamp 70 can be securely engaged to the seat post 22. By selecting which of the holes 24, 26 and 28 are used in bolting the first pair of the frame members 14 and 16 to the clamp 70, the clamp provides for adjustments for various bicycle sizes and designs and operator preferences for the distance that the bicycle accessory 10 extends behind the rear wheel 40.

Figure 5:
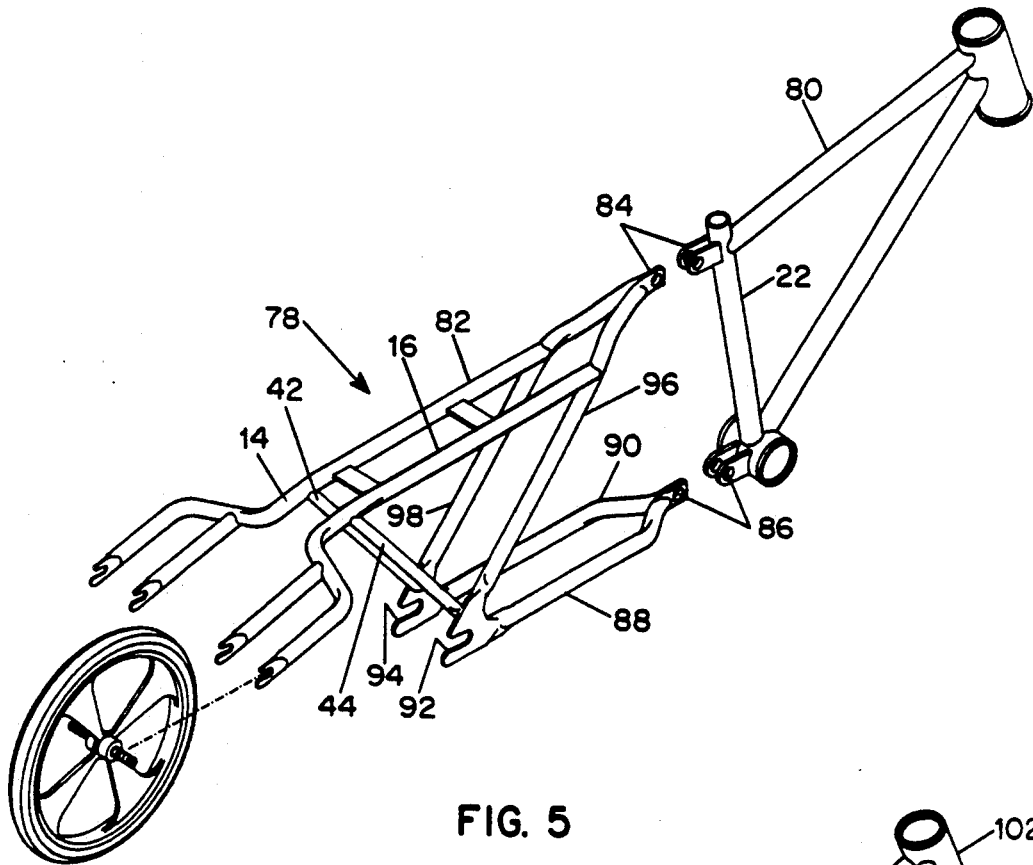
FIG. 5 is a perspective view of detachable front and rear frame members with the bicycle accessory integral to the rear frame member.

FIG. 5 shows a bicycle frame 78 having detachable front and rear frame members, 80 and 82, respectively. The front and rear frame members 80 and 82 are detachable at an upper connection 84 near the top of the bicycle seat post 22 and at a lower connection 86 at the base of the seat post 22 from where the bicycle pedals (not shown) extend. The rear frame member 82 is one integral piece including the conventional lower frame sections 88 and 90 extending from lower connection 86 to rear wheel axle slots 92 and 94. Conventional diagonal frame sections 96 and 98, also part of the rear frame member 82, extend from the upper connection 84 to the rear wheel axle slots 92 and 94. The rear frame member 82 has the first pair of frame members 14 and 16 extending aft substantially parallel to the ground and welded to the upper portions of diagonal frame sections 96 and 98. The second pair of frame members 42 and 44 are welded to the rear wheel axle slots 92 and 94 at one end and to an intermediate position of the first pair of frame members 14 and 16. Conventional bicycles with detachable front and rear frames can be converted to unconventional bicycles with wheelee wheels 32 simply by replacing the conventional rear frame with rear frame member 82.

Figure 6:
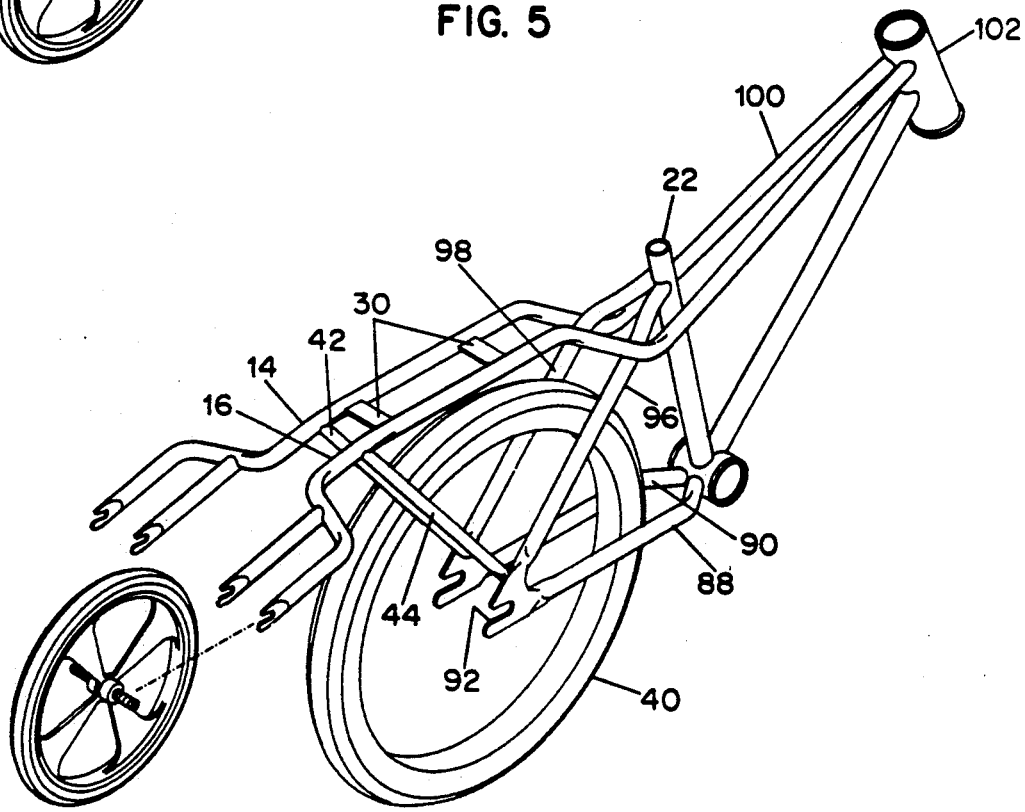
FIG. 6 is a perspective view of a bicycle frame with the bicycle accessory integral to the frame.
Figure 7:
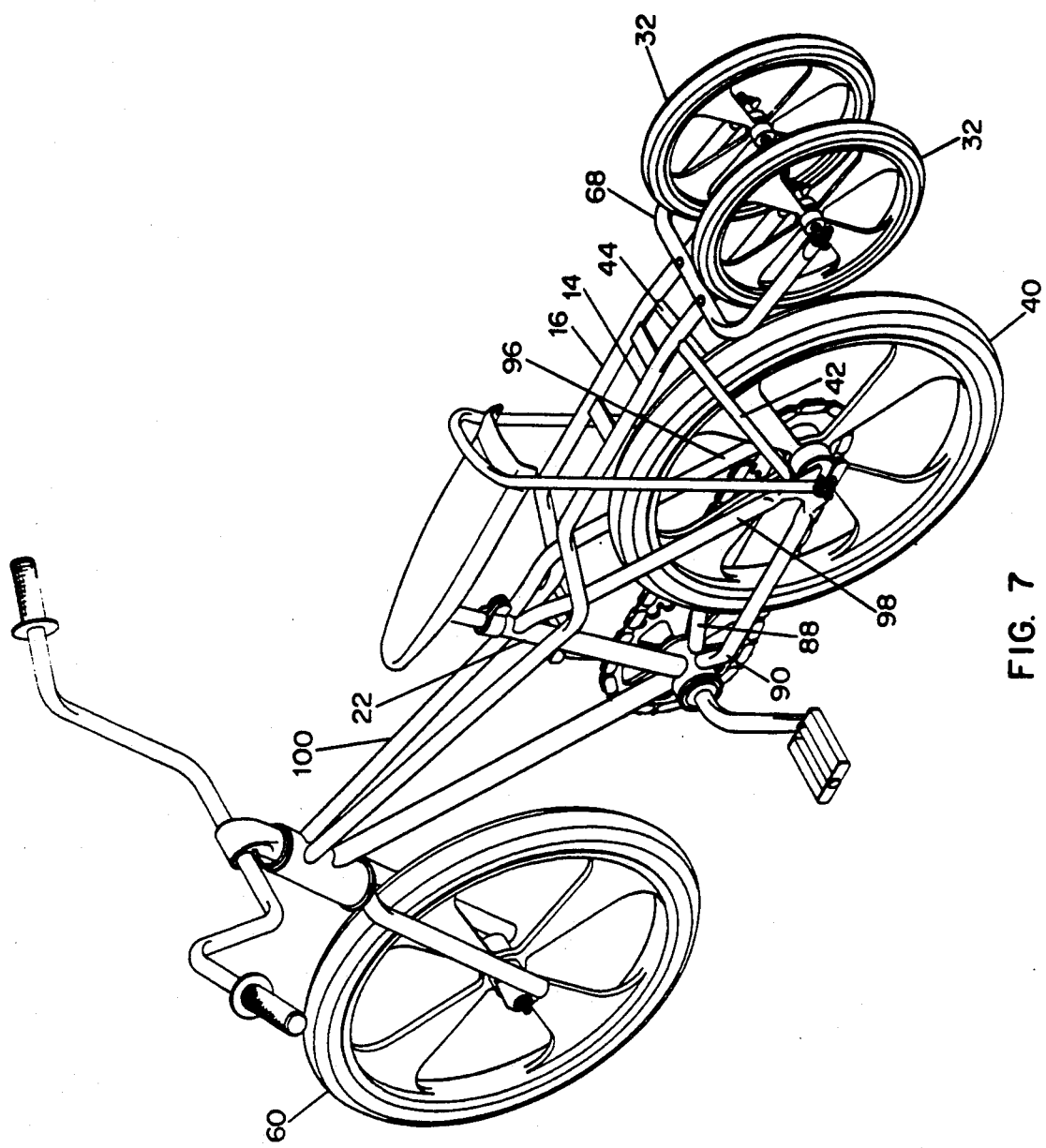
FIG. 7 is a perspective view of a bicycle with the bicycle accessory integral to the frame.

FIG. 6 shows an integral bicycle frame 100 in which the first and second pair of frame members 14, 16, 42 and 44, respectively, are non-detachable from the bicycle frame 100. FIG. 7 is an illustration of a bicycle with the integral bicycle frame 100 and a U-shaped fifth frame member. The lower frame sections 88 and 90 are integrally connected at one end to the lower end of a handle bar post 102. The other end of the lower frame sections 88 and 90 are integrally connected to the rear wheel axle slots 92. The seat post 22 extends up from its lower end intermediate between the ends of the lower frame sections 88 and 90. The diagonal frame member 96 is integrally connected at its upper end to the upper end of the seat post 22 and at its lower end to the rear wheel axle slots 92. The first pair of frame members 14 and 16 is integrally connected at one end to the upper portion of the handle bar post 102 and carry one or more wheelee wheels 32 at the second remote end of the first pair of frame members 14, 16. The second pair of frame members 42 and 44 is integrally connected at its upper end to the first pair of frame members 14, 16 intermediate between the ends of the first pair of frame members and integral at its lower end to the rear axle wheel slots 92.

While there has been described what is believed to be a preferred embodiment of the invention, those skilled in the art will recognize that modification may be made thereto without departing from the spirit of the invention and it is intended to claim all such modifications as fall within the scope of the invention.

I claim:

1. A bicycle accessory for stabilizing a bicycle when the front wheel of said bicycle is off the ground, comprising a first pair of frame members arranged for attachment together at one end to a bicycle seat post and carrying one or more wheelee wheels at a second remote end directly behind the rear wheel of the bicycle; a second pair of frame members attached to said first frame members intermediate between said ends and arranged for attachment to the rear axle of said bicycle and a substantially U-shaped fifth frame member attached to said first pair of frame members between said second pair of frame members and said remote end, for receiving a first wheelee wheel between a first tip of said U-shaped member and said remote end of the first frame member of said pair of first frame members and for receiving a second wheelee wheel between a second tip of said U-shaped member and the remote end of the second frame member of said first pair of frame members.

2. A bicycle accessory according to claim 1 wherein said first pair of frame members extends substantially parallel to the ground when the front and rear wheels of said bicycle are in contact with the ground.

3. A bicycle accessory according to claim 1 wherein each of said first pair of frame members has a plurality of holes for receiving a first bolt at said one end for attaching said first pair of frame members to said bicycle seat post at a plurality of positions.

4. A bicycle accessory according to claim 3 wherein each of said second pair of frame members has a plurality of holes for receiving a second bolt for attaching said second pair of frame members to said rear axle at a plurality of positions.

5. A bicycle accessory according to claim 4 wherein each of said first pair of frame members has a plurality of holes for receiving a third bolt intermediate between said ends for attaching said second pair of frame members to said first pair of frame members at a plurality of positions.

6. A bicycle accessory according to claim 1 wherein said substantially U-shaped fifth frame member is detachable.

7. A bicycle accessory according to claim 1 wherein said first and second pairs of frame members are integrally connected to the frame of said bicycle.

8. A bicycle accessory according to claim 1 wherein said first and second pairs of frame members are integrally connected to a rear frame member of said bicycle, said rear frame member being attachable to a front frame member to form the frame of the bicycle.

9. A detachable rear frame member of a bicycle for stabilizing said bicycle when the front wheel of said bicycle is off the ground, comprising:
upper and lower connection means for attaching said detachable rear frame member to a front frame member of said bicycle;
a pair of rear wheel axle slots for receiving the rear axle of said bicycle;
a diagonal frame member at its upper end integral to said upper connection means and at its lower end to said rear wheel axle slots;
a lower frame section integral to said lower connection means at one end and to said rear wheel axle slots at its other end;
a first pair of frame members integral at one end to the upper portion of said diagonal frame member and each having horizontally oriented forks at a second remote end for carrying one or more wheelee wheels; and
a second pair of frame members integral at its upper end to said first pair of frame members intermediate between said ends of said first pair of frame members and integral at its lower end to said rear axle wheel slots.

10. A detachable rear frame member according to claim 9 wherein said first pair of frame members extends substantially parallel to the ground when the front and rear wheels of said bicycle are in contact with the ground.

11. A detachable rear frame member according to claim 10 having a first wheelee wheel carried by said fork at said second remote end of one of said first pair of frame members and a second wheelee wheel carried by said fork at said second remote end of the other of said first pair of frame members, for stabilizing said bicycle from side to side when said front wheel is off the ground.

12. A detachable rear frame member according to claim 10 wherein said remote end of each of said first pair of frame members is arranged to receive said wheelee wheel directly behind the rear wheel of said bicycle.

13. A bicycle frame for stabilizing a bicycle when the front wheel of said bicycle is off the ground, comprising:
a handle bar post;
a pair of rear wheel axile slots for receiving the rear axle of said bicycle;
a lower frame section integral to the lower end of said handle bar posts at one end and to said rear wheel axle slots at its other end;
a seat post extending up from its lower end intermediate between said ends of said lower frame section;
a diagonal frame member integral at its upper end to the upper end of said seat post and at its lower end to said rear wheel axle slots;
a first pair of frame members extending substantially parallel to the ground when the front and rear wheels of said bicycle are in contact with the ground integral at one end to the upper portion of said handle bar post and carrying one or more wheelee wheels at a second remote end directly behind the rear wheel of the bicycle;
a second pair of frame members integral at its upper end to said first pair of frame members intermediate between said ends of said first pair of frame members and integral at its lower end to said rear axle wheel slots; and
a substantially U-shaped fifth frame member attachable to said first pair of frame members between said second pair of frame members and said remote end, for receiving a first wheelee wheel between a first tip of said U-shaped member and said remote end of the first frame member of said pair of first frame members and for receiving a second wheelee wheel between a second tip of said U-shaped member and the remote end of the second frame member of said first pair of frame members.

14. A bicycle accessory for stabilizing a bicycle when the front wheel of said bicycle is off the ground, comprising a first pair of frame members extending substantially parallel to the ground when the front and rear wheels of said bicycle are in contact with the ground, arranged for attachment together at one end to a bicycle seat post and having horizontally oriented forks at a second remote end for carrying one or more wheelee wheels, and a second pair of frame members attached to said first frame members intermediate between said ends and arranged for attachment to the rear axle of said bicycle.

15. A bicycle accessory according to claim 14 having a first wheelee wheel carried by said fork at said second remote end of one of said first pair of frame members and a second wheelee wheel carried by said fork at said second remote end of the other of said first pair of frame members, for stabilizing said bicycle from side to side when said front wheel is off the ground.

16. A bicycle frame for stabilizing a bicycle when the front wheel of said bicycle is off the ground, comprising;

a handle bar post;

a pair of rear wheel axle slots for receiving the rear axle of said bicycle;

a lower frame section integral to the lower end of said handle bar posts at one end and to said rear wheel axle slots at its other end;

a seat post extending up from its lower end intermediate between said ends of said lower frame section;

a diagonal frame member integral at its upper end to the upper end of said seat post and at its lower end to said rear wheel axle slots;

a first pair of frame members extending substantially parallel to the ground when the front and rear wheels of said bicycle are in contact with the ground integral at one end to the upper portion of said handle bar post and having horizontally oriented forks at a second remote end for carrying one or more wheelee wheels; and a second pair of frame members integral at its upper end to said first pair of frame member intermediate between said ends of said first pair of frame members and integral at its lower end to said rear axle wheel slots.

17. A bicycle frame according to claim 16 having a first wheelee wheel carried by said fork at said second remote end of one of said first pair of frame members and a second wheelee wheel carried by said fork at said second remote end of the other of said first pair of frame members, for stabilizing said bicycle from side to side when said front wheel is off the ground.

* * * * *